(12) United States Patent
Berry et al.

(10) Patent No.: US 12,335,262 B2
(45) Date of Patent: Jun. 17, 2025

(54) SYSTEMS, METHODS, AND APPARATUSES FOR IMPLEMENTING A SINGLE POINT MULTI-COMPONENT AUTHENTICATION USING A PRE-DETERMINED SEQUENCE IN AN ELECTRONIC NETWORK

(71) Applicant: BANK OF AMERICA CORPORATION, Charlotte, NC (US)

(72) Inventors: Anna Kristen Pingel Berry, Indian Land, SC (US); Olga Kocharyan, Matthews, NC (US); Ravi Joshi, Pennington, NJ (US); Luqman Sharief, Libertyville, IL (US); Michael Wm. Whitaker, Fort Worth, TX (US); Benjamin Daniel Hardman, Harrisburg, NC (US); Shweta Ambulkar, Plainsboro, NJ (US); Angela Ianni, Lincoln, RI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 280 days.

(21) Appl. No.: 18/123,063

(22) Filed: Mar. 17, 2023

(65) Prior Publication Data
US 2024/0314127 A1 Sep. 19, 2024

(51) Int. Cl.
*H04L 9/40* (2022.01)
*G06F 21/36* (2013.01)
*H04W 12/06* (2021.01)

(52) U.S. Cl.
CPC .......... *H04L 63/0884* (2013.01); *G06F 21/36* (2013.01); *H04L 63/083* (2013.01); *H04W 12/068* (2021.01)

(58) Field of Classification Search
CPC ... H04L 63/0884; H04L 63/083; G06F 21/36; H04W 12/068
See application file for complete search history.

(56) References Cited

U.S. PATENT DOCUMENTS

| | | | |
|---|---|---|---|
| 6,118,872 | A | 9/2000 | Kashima |
| 6,209,104 | B1 | 3/2001 | Jalili |
| 6,246,769 | B1 | 6/2001 | Kohut |

(Continued)

*Primary Examiner* — Huan V Doan
(74) *Attorney, Agent, or Firm* — Moore & Van Allen PLLC; Lauren M. Stokes

(57) ABSTRACT

Systems, computer program products, and methods are described herein for implementing a single point multi-component authentication using a pre-determined sequence in an electronic network. The present disclosure is configured to identify a pre-determined sequence associated with a user account; identify a plurality of valid authentication credentials associated with the user account; generate a multi-component authentication graphical user interface, wherein the multi-component authentication graphical user interface comprises a plurality of input locations; receive a first authentication credential at a first unverified location of the plurality of input locations; determine whether the first authentication credential is valid; receive a second authentication credential at a second unverified location of the plurality of input locations; determine whether the second authentication credential is valid; and allow, in an instance where the first authentication credential is valid and the second authentication credential is valid, access to the user account.

17 Claims, 9 Drawing Sheets

(56) References Cited

U.S. PATENT DOCUMENTS

| | | |
|---|---|---|
| 7,613,919 B2 | 11/2009 | Bagley |
| 7,840,993 B2 | 11/2010 | Ganesan |
| 7,886,346 B2 | 2/2011 | Sandhu |
| 8,041,954 B2 | 10/2011 | Plesman |
| 8,191,126 B2 | 5/2012 | Raghavan |
| 8,214,892 B2 | 7/2012 | Cohen |
| 8,332,921 B2 | 12/2012 | Sandhu |
| 8,407,475 B2 | 3/2013 | Ganesan |
| 9,300,659 B2 | 3/2016 | Thibadeau, Sr. |
| 9,323,435 B2 | 4/2016 | Thibadeau, Sr. |
| 9,323,944 B2 | 4/2016 | Waltermann |
| 9,576,123 B2 | 2/2017 | Potnuru |
| 9,813,411 B2 | 11/2017 | Thibadeau, Sr. |
| 9,928,501 B1 * | 3/2018 | Edwards ................ G06Q 20/20 |
| 10,169,565 B2 | 1/2019 | Zia |
| 2005/0160297 A1 | 7/2005 | Ogawa |
| 2007/0074119 A1 | 3/2007 | Komine |
| 2008/0077978 A1 | 3/2008 | Repasi |
| 2008/0141362 A1 | 6/2008 | Torres |
| 2008/0141363 A1 | 6/2008 | White |
| 2014/0115670 A1 | 4/2014 | Barton |
| 2018/0191702 A1 * | 7/2018 | Padmanabhan ....... H04L 63/083 |

\* cited by examiner

SYSTEMS, METHODS, AND APPARATUSES FOR IMPLEMENTING A SINGLE POINT MULTI-COMPONENT AUTHENTICATION USING A PRE-DETERMINED SEQUENCE IN AN ELECTRONIC NETWORK

TECHNOLOGICAL FIELD

Example embodiments of the present disclosure relate to implementing a single point multi-component authentication using a pre-determined sequence in an electronic network.

BACKGROUND

Managers of an electronic network which additionally manage access to user accounts may have a difficult time determining and preventing a bad actor's attempts to access a user account. For instance, and where a bad actor may have access to at least one passcode associated with user account—such as by misappropriation and/or the like—the bad actor may have an easier time guessing and/or brute force attacking the authentication credentials to gain access to a user account. Further, and where a passcode may be accurately guessed by a bad actor for a user account, there exists a need to prevent such access automatically, accurately, efficiently, and on a large-scale without individually tracking each user account access data in real-time.

Applicant has identified a number of deficiencies and problems associated with implementing a single point multi-component authentication using a pre-determined sequence in an electronic network. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for implementing a single point multi-component authentication using a pre-determined sequence in an electronic network.

In one aspect, a system for implementing a single point multi-component authentication using a pre-determined sequence is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify a pre-determined sequence associated with a user account, wherein the pre-determined sequence comprises a first authenticated input location and at least a second authenticated input location; identify a plurality of valid authentication credentials associated with the user account, wherein the plurality of valid authentication credentials comprises a first valid authentication credential and at least a second valid authentication credential; generate a multi-component authentication graphical user interface, wherein the multi-component authentication graphical user interface comprises a plurality of input locations; receive a first authentication credential at a first unverified location of the plurality of input locations; determine whether the first authentication credential is valid, wherein, in an instance where the first unverified location is the same as the first authenticated input location and wherein the first authentication credential is the same as the first valid authentication credential, determine the first authentication credential to be valid; receive a second authentication credential at a second unverified location of the plurality of input locations; determine whether the second authentication credential is valid, wherein, in an instance where the second unverified location is the same as the at least second authenticated input location and wherein the second authentication credential is the same as the at least second valid authentication credential, determine the second authentication credential is valid; and allow, in an instance where the first authentication credential is valid and the second authentication credential is valid, access to the user account.

In some embodiments, the processing device is further configured to: determine whether the first authentication credential is invalid, wherein, in an instance where at least one of the first unverified location is not the same as the first authenticated input location or wherein the first authentication credential is not the same as the first valid authentication credential, determine the first authentication credential is invalid; determine whether the second authentication credential is invalid, wherein, in an instance where at least one of the second unverified location is not the same as the at least second authenticated input location or wherein the second authentication credential is not the same as the at least second valid authentication credential, determine the second authentication credential is invalid; and disallow, in an instance where at least one of the first authentication credential or the second authentication credential is invalid, access to the user account.

In some embodiments, the pre-determined sequence is generated by a single point multi-component authentication machine learning model. In some embodiments, the single-point multi-component authentication machine learning model is trained and wherein the processing device is further configured to: identify data associated with the user account, wherein the data comprises at least one of threat data, current access data, historical access data, or rank data; create a first training data set comprising the data associated with the user account; and train the single point multi-component authentication machine learning model in a first stage using the data associated with the user account.

In some embodiments, the pre-determined sequence is generated by a user associated with the user account.

In some embodiments, the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

In some embodiments, the at least the second authenticated input location is less than the plurality of input locations.

In some embodiments, the first valid authentication credential is a first passcode and wherein the second valid authentication credential is a second passcode.

In some embodiments, the first valid authentication credential is a first portion of a passcode and the second valid authentication credential is a second portion of the passcode.

In some embodiments, the processing device is further configured to: receive a submission request for the first authentication credential; generate, based on the submission request for the first authentication credential, a plurality of blank input locations for the plurality of input locations; receive a second submission request for the second authentication credential; and generate, based on the second submission request for the second authentication credential, the plurality of blank input locations for the plurality of input locations.

In another aspect, a computer-program product for implementing a single point multi-component authentication using a pre-determined sequence is provided. In some embodiments, the computer program product may comprise at least one non-transitory computer-readable medium having computer-readable program code portions embodied therein, the computer-readable program code portions which when executed by a processing device are configured to cause the processor to: identify a pre-determined sequence associated with a user account, wherein the pre-determined sequence comprises a first authenticated input location and at least a second authenticated input location; identify a plurality of valid authentication credentials associated with the user account, wherein the plurality of valid authentication credentials comprises a first valid authentication credential and at least a second valid authentication credential; generate a multi-component authentication graphical user interface, wherein the multi-component authentication graphical user interface comprises a plurality of input locations; receive a first authentication credential at a first unverified location of the plurality of input locations; determine whether the first authentication credential is valid, wherein, in an instance where the first unverified location is the same as the first authenticated input location and wherein the first authentication credential is the same as the first valid authentication credential, determine the first authentication credential to be valid; receive a second authentication credential at a second unverified location of the plurality of input locations; determine whether the second authentication credential is valid, wherein, in an instance where the second unverified location is the same as the at least second authenticated input location and wherein the second authentication credential is the same as the at least second valid authentication credential, determine the second authentication credential is valid; and allow, in an instance where the first authentication credential is valid and the second authentication credential is valid, access to the user account.

In some embodiments, the processing device is configured to cause the processor to: determine whether the first authentication credential is invalid, wherein, in an instance where at least one of the first unverified location is not the same as the first authenticated input location or wherein the first authentication credential is not the same as the first valid authentication credential, determine the first authentication credential is invalid; determine whether the second authentication credential is invalid, wherein, in an instance where at least one of the second unverified location is not the same as the at least second authenticated input location or wherein the second authentication credential is not the same as the at least second valid authentication credential, determine the second authentication credential is invalid; and disallow, in an instance where at least one of the first authentication credential or the second authentication credential is invalid, access to the user account.

In some embodiments, the pre-determined sequence is generated by a single point multi-component authentication machine learning model. In some embodiments, the processing device is configured to cause the processor to: identify data associated with the user account, wherein the data comprises at least one of threat data, current access data, historical access data, or rank data; create a first training set comprising the data associated with the user account; and train the single point multi-component authentication machine learning model in a first stage using the data associated with the user account.

In some embodiments, the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

In another aspect, a computer-implemented method for implementing a single point multi-component authentication using a pre-determined sequence is provided. In some embodiments, the computer-implemented method may comprise: identifying a pre-determined sequence associated with a user account, wherein the pre-determined sequence comprises a first authenticated input location and at least a second authenticated input location; identifying a plurality of valid authentication credentials associated with the user account, wherein the plurality of valid authentication credentials comprises a first valid authentication credential and at least a second valid authentication credential; generating a multi-component authentication graphical user interface, wherein the multi-component authentication graphical user interface comprises a plurality of input locations; receiving a first authentication credential at a first unverified location of the plurality of input locations; determining whether the first authentication credential is valid, wherein, in an instance where the first unverified location is the same as the first authenticated input location and wherein the first authentication credential is the same as the first valid authentication credential, determine the first authentication credential to be valid; receiving a second authentication credential at a second unverified location of the plurality of input locations; determining whether the second authentication credential is valid, wherein, in an instance where the second unverified location is the same as the at least second authenticated input location and wherein the second authentication credential is the same as the at least second valid authentication credential, determining the second authentication credential is valid; and allowing, in an instance where the first authentication credential is valid and the second authentication credential is valid, access to the user account.

In some embodiments, the computer-implemented method further comprises: determining whether the first authentication credential is invalid, wherein, in an instance where at least one of the first unverified location is not the same as the first authenticated input location or wherein the first authentication credential is not the same as the first valid authentication credential, determine the first authentication credential is invalid; determine whether the second authentication credential is invalid, wherein, in an instance where at least one of the second unverified location is not the same as the at least second authenticated input location or wherein the second authentication credential is not the same as the at least second valid authentication credential, determine the second authentication credential is invalid; and disallow, in an instance where at least one of the first authentication credential or the second authentication credential is invalid, access to the user account.

In some embodiments, the pre-determined sequence is generated by a single point multi-component authentication machine learning model. In some embodiments, the computer-implemented method further comprises: identifying data associated with the user account, wherein the data comprises at least one of threat data, current access data, historical access data, or rank data; creating a first training set comprising the data associated with the user account; and training the single point multi-component authentication machine learning model in a first stage using the data associated with the user account.

In some embodiments, the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
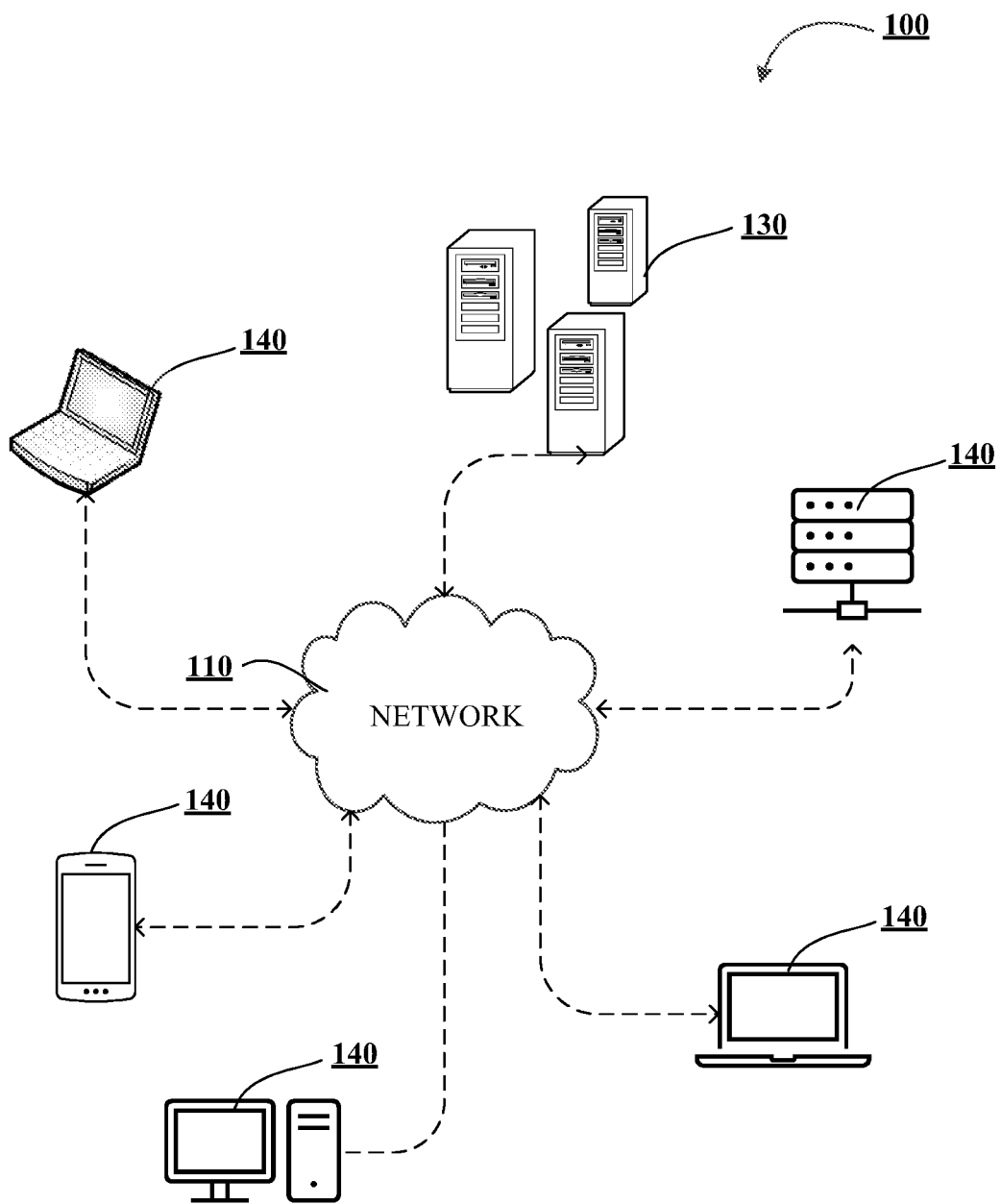
Figure 1B:
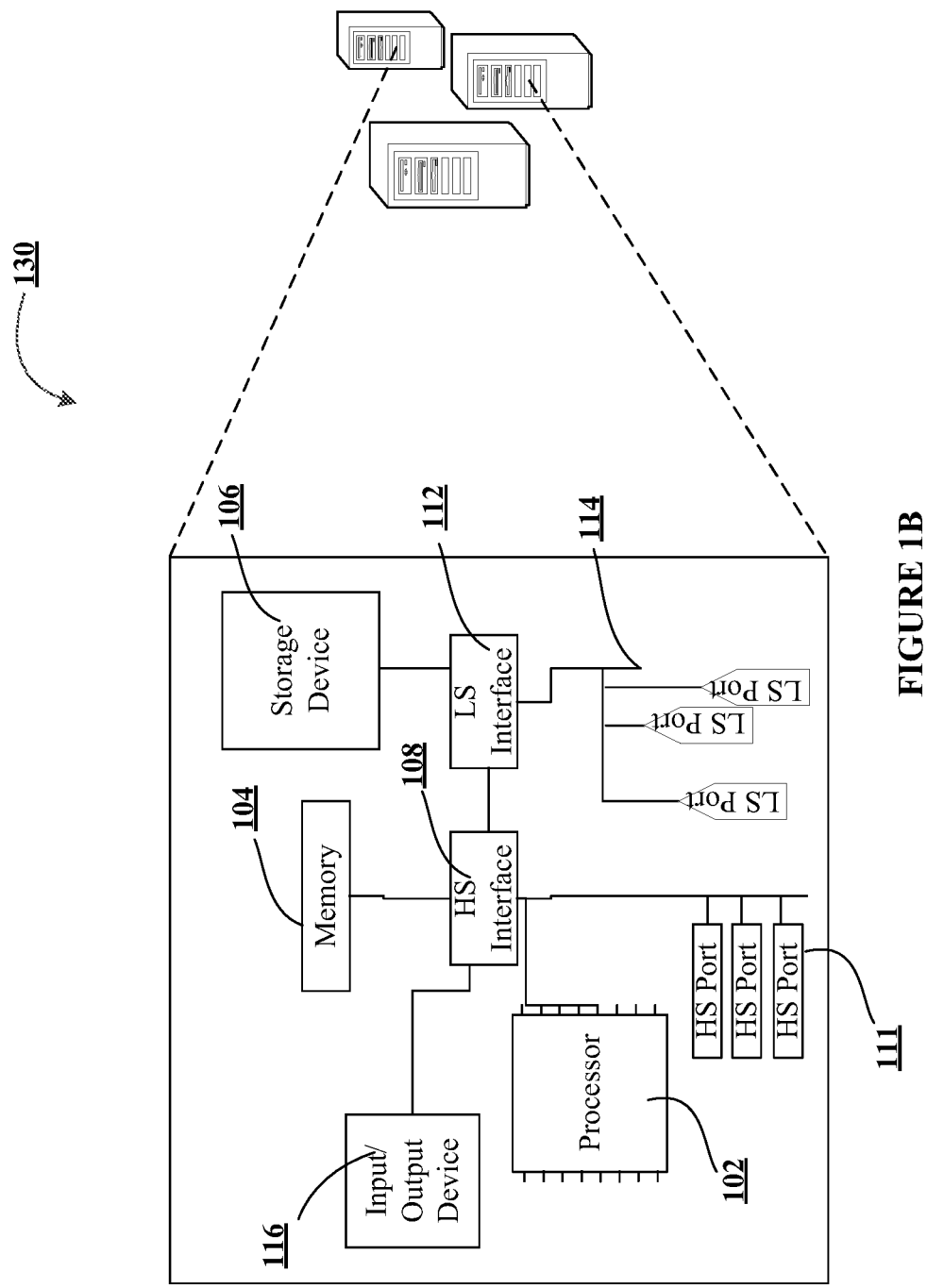
Figure 1C:
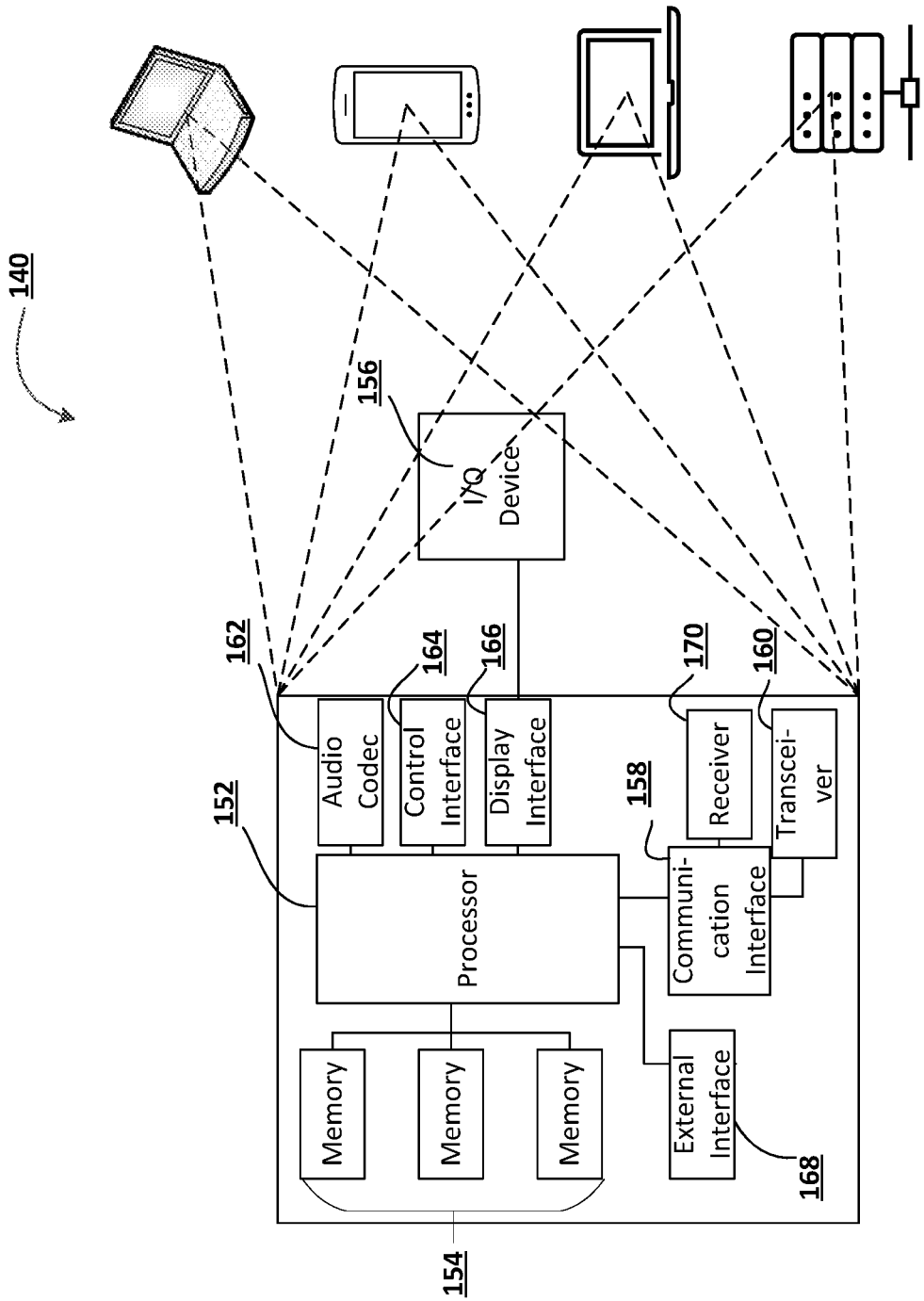
Figure 2:
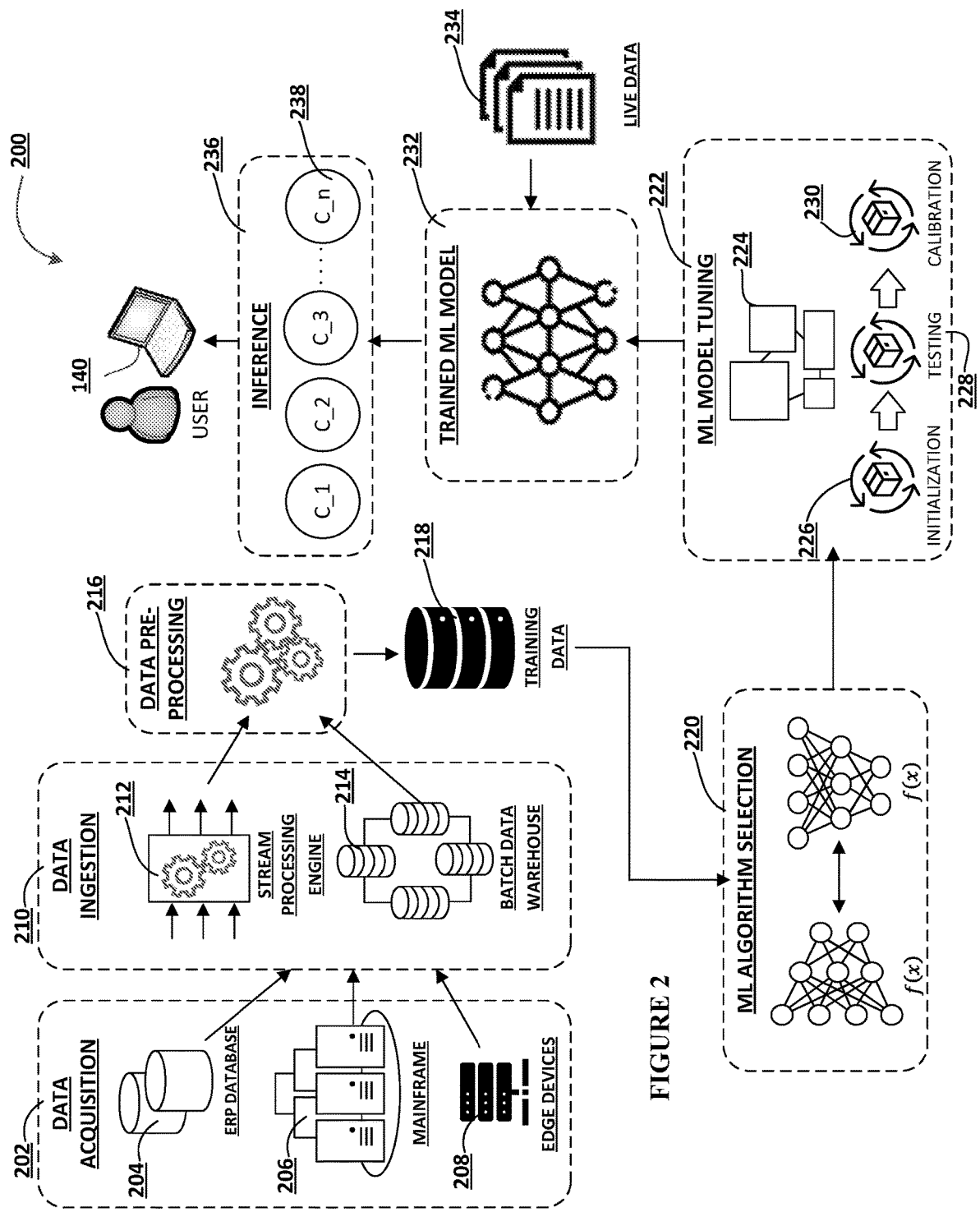
Figure 3:
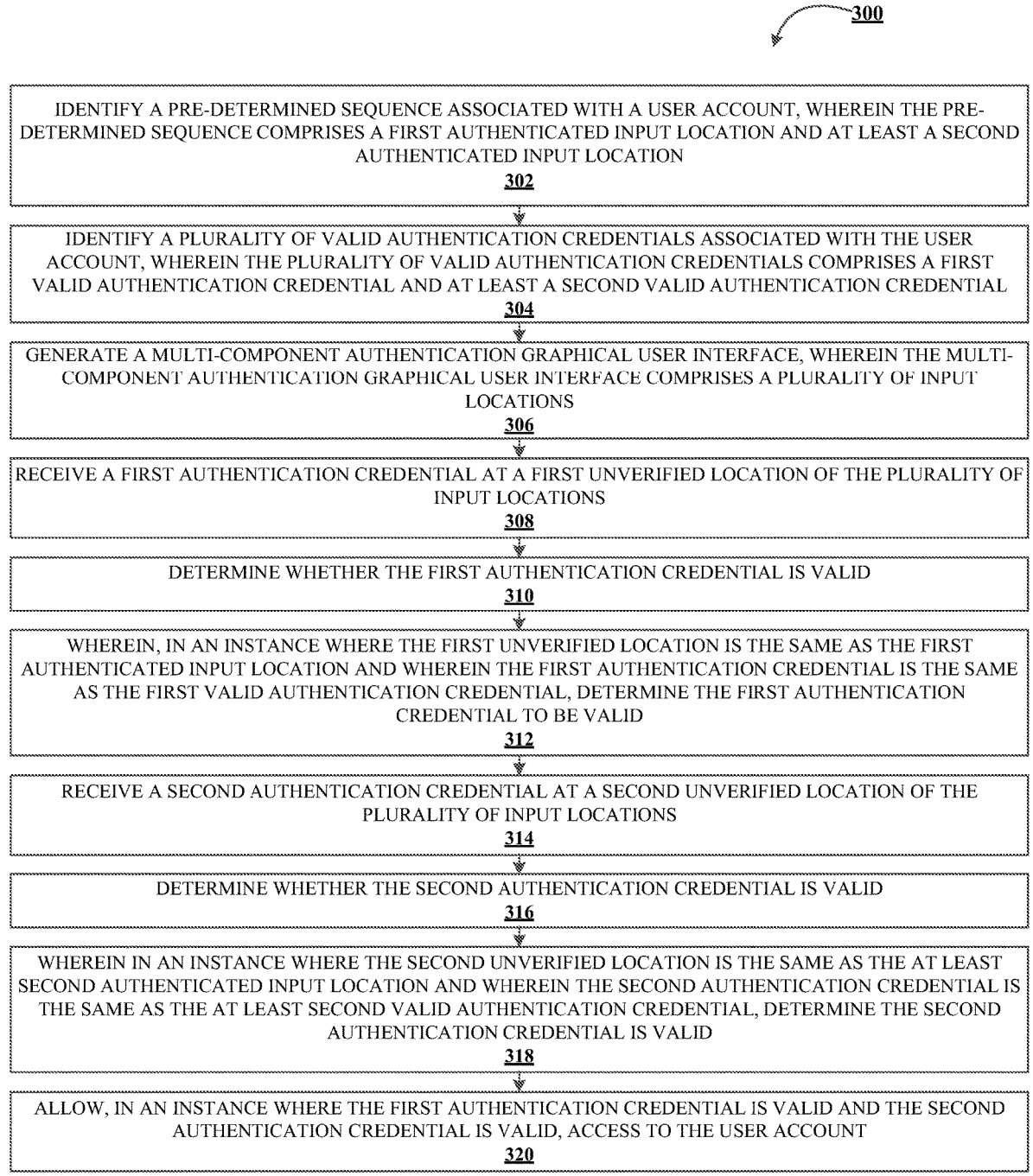
Figure 4:
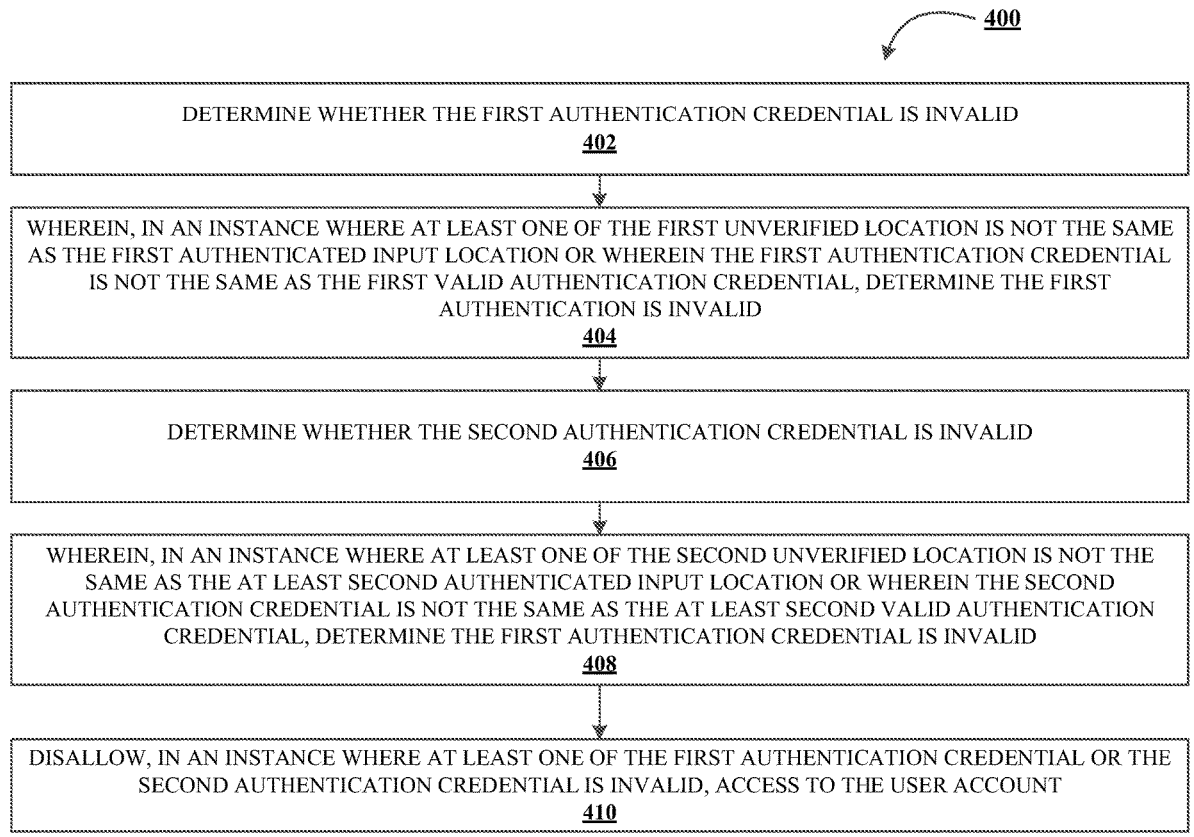
Figure 5:
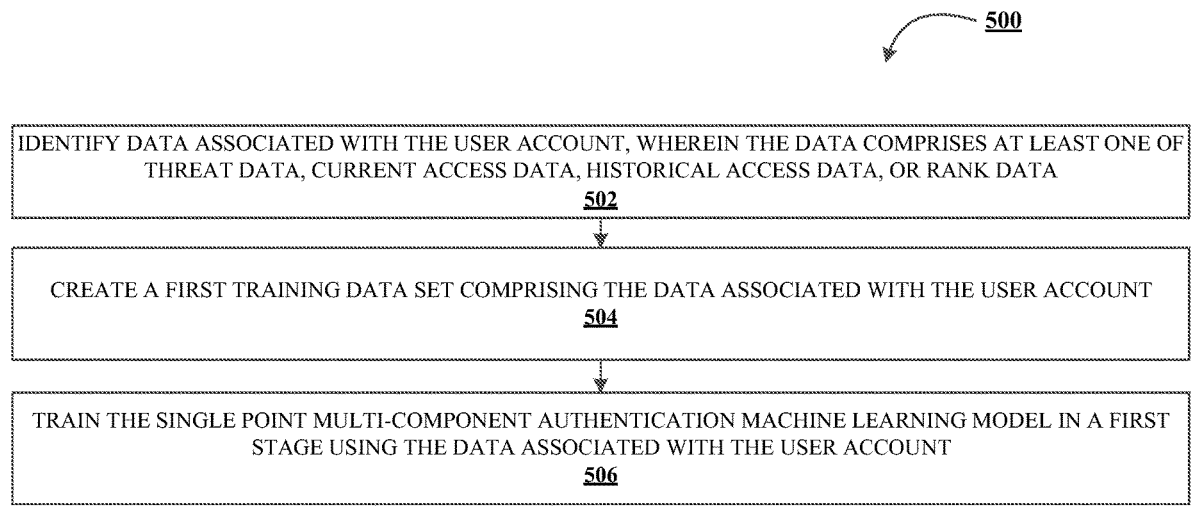
Figure 6:
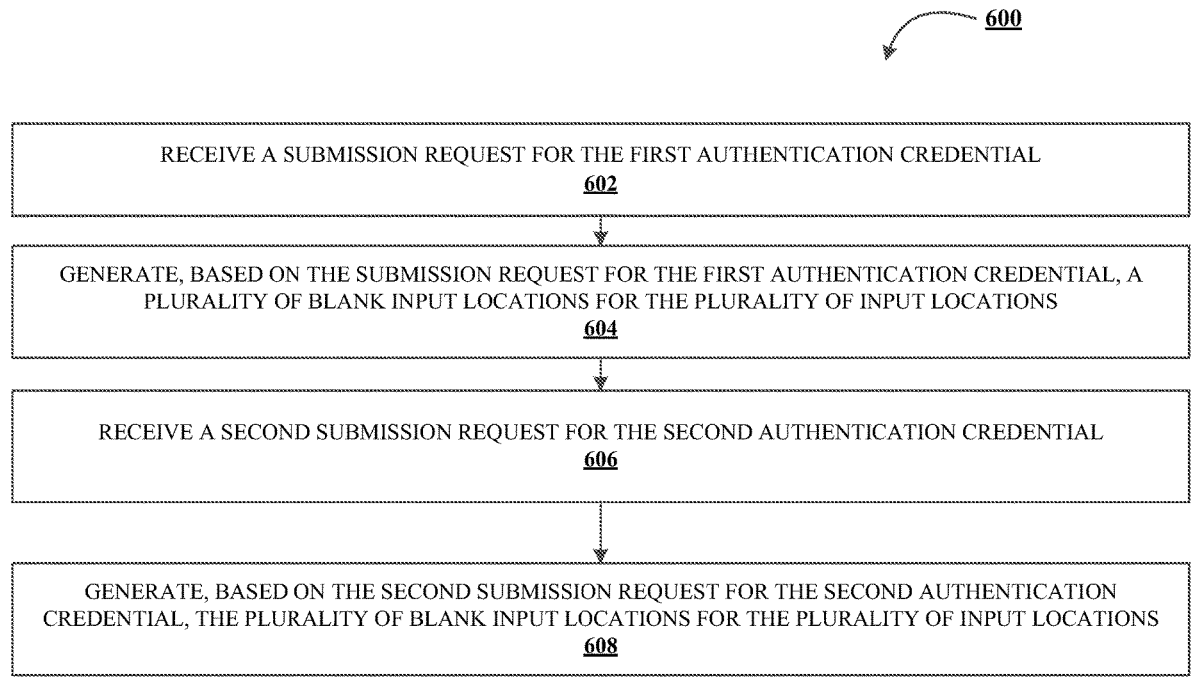
Figure 7:
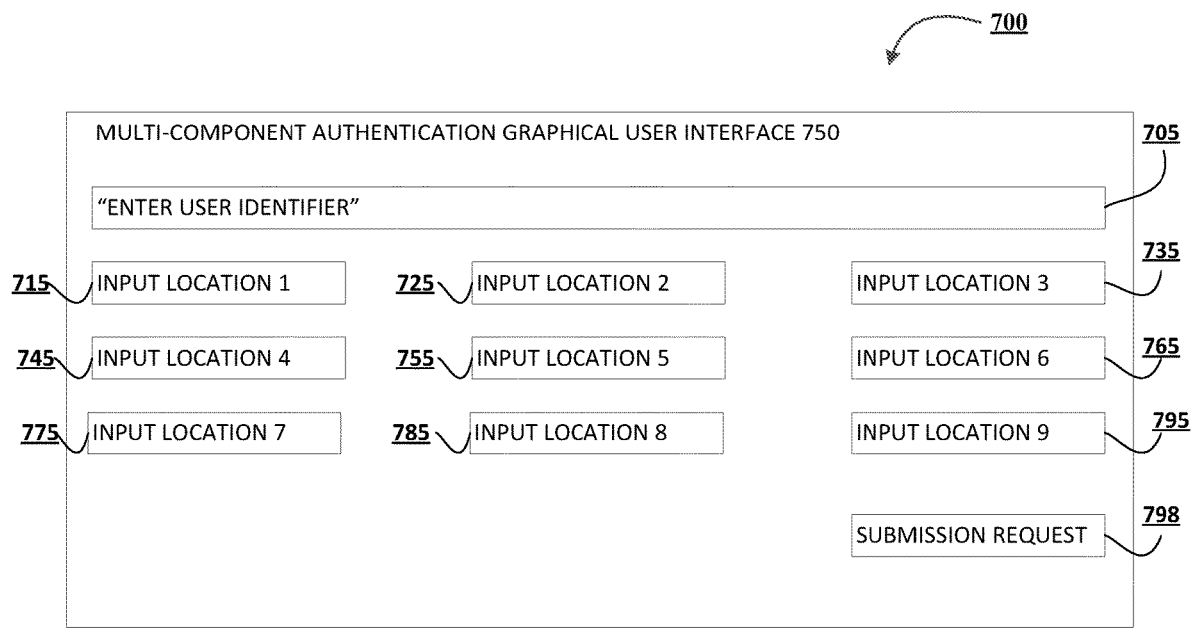

FIGS. 1A-1C illustrates technical components of an exemplary distributed computing environment for implementing a single point multi-component authentication using a pre-determined sequence, in accordance with an embodiment of the disclosure;

FIG. 2 illustrates technical components of an exemplary machine learning environment, in accordance with an embodiment of the disclosure;

FIG. 3 illustrates a process flow for implementing a single point multi-component authentication using a pre-determined sequence, in accordance with an embodiment of the disclosure;

FIG. 4 illustrates a process flow for disallowing access to the user account, in accordance with an embodiment of the disclosure;

FIG. 5 illustrates a process flow for training a single point multi-component authentication machine learning model, in accordance with an embodiment of the disclosure;

FIG. 6 illustrates a process flow for generating a plurality of blank input locations for the plurality of input locations on a graphical user interface, in accordance with an embodiment of the disclosure; and FIG. 7 illustrates an exemplary multi-component authentication graphical user interface, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As described in further detail herein, the present disclosure provides a solution to the above-referenced problems in the field of technology by generating a single point multi-component authentication system which is designed to automatically, accurately, efficiently, and on a large-scale determine and prevent user account access by bad actors. Such single point multi-component authentication system may further comprise a single point multi-component authentication machine learning model which may be trained with data associated with at least one user account to determine a user account's threat level and determine at least one of a pre-determined sequence and/or valid authentication credentials based on the user account's threat level. The present disclosure solves the above technical problems by implementing the single point multi-component authentication system—like that shown as system 130—to track each of the authentication credentials received at input locations on a graphical user interface to determine a match of valid authentication credentials associated with a pre-determined sequence. In this manner, the single point multi-component authentication system requires the inputs of authentication credentials in a particular sequence and in particular locations in order to allow access to the user account, whereby a plurality of authentication credentials would be required and a plurality of particular locations would be required for the pre-determined sequence.

Accordingly, the present disclosure comprises a single point multi-component authentication system which is configured to identify a pre-determined sequence of authenticated input locations associated with the user account, identify a plurality of valid authentication credentials (e.g., passcodes and/or passwords) associated with the user account and the pre-determined sequence, generate a multi-component authentication graphical user interface which comprises a plurality of (potential) input locations for the authentication credentials. Further, and in some embodiments, the single point multi-component authentication system may allow access to the user account when the authentication credentials received at the plurality of input locations match the plurality of valid authentication credentials associated with the plurality of authenticated input locations of the pre-determined sequence. Thus, the single point multi-component authentication system is configured to allow access to a user attempting access to the user account, whereby the user must know the correct sequence of input locations and the correct passcodes for each, individual input location (i.e., the verified user of the user account).

What is more, the present disclosure provides a technical solution to a technical problem. As described herein, the technical problem includes the automatic, accurate, efficient, and large-scale determination and prevention of unverified access to user accounts (e.g., by bad actors) in an electronic network. The technical solution presented herein allows for the accurate determining of instance of a user account access attempt as being attempted by a verified user or unverified user, the efficient determination and large-scale determination for all the user accounts associated with an electronic network, and the automatic determination when the predetermined sequence of input locations and associated authentication credentials are not input correctly. In particular, the single point multi-component authentication system is an improvement over existing solutions to the security of electronic user accounts on a large-scale, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing a single point multi-component authentication using predetermined sequence in an electronic network 100, in accordance with an embodiment of the invention. As shown in FIG. 1A, the distributed computing environment 100 contemplated herein may include a system 130 (i.e., a single point multi-component authentication system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 ... C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 ... C_n 238) live data 234 based on how similar they are to one another to solve exploratory challenges where little is known about the data, provide a description or label (e.g., C_1, C_2 ... C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for implementing a single point multi-component authentication using a pre-determined sequence, in accordance with an embodiment of the invention. In some embodiments, a system (e.g., similar to one or more of the systems described herein with respect to FIGS. 1A-1C and 2) may perform one or more of the steps of process flow 300. For example, a single point multi-component authentication system (e.g., the system 130 described herein with respect to FIG. 1A-1C) may perform the steps of process flow 300.

As shown in block 302, the process flow 300 may include the step of identifying a pre-determined sequence associated with a user account, wherein the pre-determined sequence comprises a first authenticated input location and at least a second authenticated input location. In some embodiments, the single point multi-component authentication system may identify a pre-determined sequence, whereby the pre-determined sequence may comprise at least one authenticated input location from a plurality of input locations. Such authenticated input location or plurality of authenticated input locations (e.g., a first authenticated input location, at least a second authenticated input location, a third authenticated input location, a fourth authenticated input location, a fifth authenticated input location, a sixth authenticated input location, a seventh authenticated input location, an eighth authenticated input location, and/or the like). In some embodiments, the pre-determined sequence and associated authenticated input locations may be pre-determined by at least one of a machine learning model (e.g., a single point multi-component authentication machine learning model which is described in further detail below), the user associated with the user account (e.g., such as the verified user of the user account, the manager of the user account, and/or the like), a manager of the single point multi-component authentication system, and/or the like.

In some embodiments, the single point multi-component authentication system may identify the pre-determined sequence to comprise a plurality of authenticated input locations, whereby the plurality of authenticated input locations may comprise pre-selected/pre-determined input locations (e.g., a first authenticated input location, a second authenticated input location, a third authenticated input location, a fourth authenticated input location, a fifth authenticated input location, and/or the like) to receive authentication credentials. Such a plurality of authenticated input locations may be used for the pre-determined sequence such that the authentication credentials are input in a particular sequence to allow access to the user account. In this manner, the single point multi-component authentication system may be required to show and/or indicate the pre-determined sequence to the user of the user account before the user may input the authentication credentials in the correct sequence.

As shown in block 304, the process flow 300 may include the step of identifying a plurality of valid authentication credentials associated with the user account, wherein the plurality of valid authentication credentials comprises a first valid authentication credential and at least a second valid authentication credential. In some embodiments, the single point multi-component authentication system may identify a plurality of valid authentication credentials associated with a user account based on receiving the valid authentication credentials from the user associated with the user account (e.g., receiving an indication and/or input from the user via a graphical user interface configured to receive at least one authentication credential, such as a passcode).

In some embodiments, the single point multi-component authentication system may identify the plurality of valid authentication credentials by splitting and/or splicing the received at least one authentication credential, such as a passcode, into a plurality of authentication credentials. For instance, and where an authentication credential received comprises the phrase, "Un1qu3.Pa$$cod3" the single point multi-component authentication system may split or splice the authentication credential into two authentication credentials such as "Un1qu3." and "Pa$$cod3" for a first authentication credential and a second authentication credential. In some embodiments, a machine learning model may splice the received authentication credential(s), and/or generate the authentication credential(s) for the user associated with the user account to input.

As shown in block 306, the process flow 300 may include the step of generating a multi-component authentication graphical user interface, wherein the multi-component authentication graphical user interface comprises a plurality of input locations. By way of non-limiting example, the single point multi-component authentication system may generate the multi-component authentication graphical user interface (e.g., similar to the exemplary graphical user interface shown in FIG. 7), which may further comprise a plurality of input locations (e.g., a plurality of potential authentication input locations and a plurality of input locations which may not be pre-determined to receive authentication credentials). Thus, the graphical user interface may comprise more input locations than the plurality of authenticated input locations which have been pre-determined by the single point multi-component authentication system.

As shown in block 308, the process flow 300 may include the step of receiving a first authentication credential at a first unverified location of the plurality of input locations. By way of non-limiting example, the single point multi-component authentication system may receive a first authentication credential at a first unverified location of the plurality of input locations at the multi-component authentication graphical user interface. For instance, the single point multi-component authentication system may receive an authentication credential (e.g., a passcode) at an input location in the multi-component authentication graphical user interface and the single point multi-component authentication system may determine whether the authentication credential has been entered/input into the correct authenticated input location. If, in the embodiment, where the authentication credential has been entered into the correct authenticated input location, the single point multi-component authentication system may determine the authentication credential is valid. However, and where the authenticated credential entered is incorrect for at least one of the input location (e.g., not entered in the authenticated input location associated with the a particular valid authentication credential and/or the authenticated credential is not entered correctly to match the valid authentication credential for either the sequence of authentication credentials and/or to match any of the valid authentication credentials associated with the user account), the single point multi-component authentication system may determine the authentication credential input is invalid.

Based on the authentication received at the unverified input location, the single point multi-component authentication system may determine whether the unverified input location matches the authenticated input location. Specifically, the single point multi-component authentication system may be configured to determine whether the unverified input location for the authentication credential entered is in the correct location and in the correct sequence for the pre-determined sequence. For instance, the single point multi-component authentication system may compare the first unverified input location of the plurality of input locations of the multi-component authentication graphical user interface to the first authenticated input location of the pre-determined sequence to determine a match.

As shown in block 310, the process flow 300 may include the step of determining whether the first authentication credential is valid. In some embodiments, the single point multi-component authentication system may determine whether the first authentication credential is valid based on the receipt of the authentication credential entered and its input location in the multi-component authentication graphical user interface as compared to the pre-determined first authenticated input location and the first valid authentication credential.

As shown in block 312, the process flow 300 may include the step of determining, in an instance where the first unverified location is the same as the first authenticated input location and where the first authentication credential is the same as the first valid authentication credential, the first authentication credential to be valid. By way of non-limiting example, the single point multi-component authentication system may determine an authentication credential to be valid based on the pre-determined sequence of the authenticated input location and the input location of the authentication credential and the authentication credential input as compared to the valid authentication credential. In this manner, and in order for access to be granted to the user account, each of the authenticated input locations of the pre-determined sequence and each of the valid authentication credentials must be entered in the correct sequence and in the correct input locations. Thus, and firstly, the single point multi-component authentication system must determine whether the first unverified location is the same as the first authenticated input location and whether the first authentication credential input is the same as the first valid authentication credential.

As shown in block 314, the process flow may include the step of receiving a second authentication credential at a second unverified location of the plurality of input locations. By way of non-limiting example, the single point multi-component authentication system may receive a second authentication credential at a second unverified location of the plurality of input locations of the multi-component authentication graphical user interface, once the first authentication credential has been received at the first unverified location.

In some embodiments, and once a first authentication credential has been entered and/or input into a first unverified input location, the single point multi-component authentication system may submit the first authentication credential and generate a blank input location for each of the plurality of input locations. In this manner, the single point multi-component authentication system may indicate all of the plurality of input locations to be blank after receiving each authentication credential for the pre-determined sequence. For instance, and where the pre-determined sequence comprises three valid authentication credentials, the single point multi-component authentication system may generate the plurality of input locations to be a plurality of blank input locations after receiving each of the authentication credentials, until three authentication credentials have been received. In some embodiments, and at the point where the final authentication credential has been received for the plurality of valid authentication credentials, the single point multi-component authentication system may allow or disallow access to the user account and configure the multi-component authentication graphical user interface to show the user that access has been allowed or disallowed.

In some embodiments, and once a first authentication credential has been entered and/or input into a first unverified input location and the first authentication credential has been determined as valid, the single point multi-component authentication system may generate a blank input location for each of the plurality of input locations. In this manner, the single point multi-component authentication system may indicate all of the plurality of input locations to be blank after receiving and validating each authentication credential for the pre-determined sequence. For instance, and where the pre-determined sequence comprises three valid authentication credentials, the single point multi-component authentication system may generate the plurality of input locations to be a plurality of blank input locations after validating each of the authentication credentials. In some embodiments, and at the point where the final authentication credential has been validated, the single point multi-component authentication system may allow or disallow access to the user account and configure the multi-component authentication graphical user interface to show the user that access has been allowed or disallowed. In some embodiments, and where at least one of the authentication credentials has been determined as invalid, the single point multi-component authentication system may immediately generate a graphical user interface to show the user has not been allowed access to the user account. Such a determination of the authentication credential as invalid is further detailed below with respect to FIG. 4.

As shown in block 316, the process flow 300 may include the step of determining whether the second authentication credential is valid. By way of non-limiting example, the single point multi-component authentication system may determine whether a second authentication received is valid. Similar to the processes described above with respect to validating the first authentication credential, the single point multi-component authentication system may likewise determine the second authentication credential is valid through the same processes described herein. Thus, and in some embodiments, for each of the valid authentication credentials of the pre-determined sequence, the single point multi-component authentication system must determine whether each of the received authentication credentials and their associated unverified input locations match the associated valid authentication credentials and associated authenticated input locations are correct, respectively.

As shown in block 318, the process flow 300 may include the step of determining, in an instance where the second unverified location is the same as the at least second input location and wherein the second authentication credential is the same as the at least second valid authentication credential, the second authentication credential is valid. By way of non-limiting example, the single point multi-component authentication system may determine the second unverified input location and the second authentication credential match the second authenticated input location and the second valid authentication credential of the pre-determined sequence, respectively. In some embodiments and where the pre-determined sequence comprises only two authenticated input locations and associated valid authentication credentials, the single point multi-component authentication system may automatically allow access where the first authentication credential has been determined to be valid and where the second authentication credential has been determined to be valid.

As shown in block 320, the process flow 300 may include the step of allowing, in an instance where the first authentication credential is valid and the second authentication credential is valid, access to the user account. By way of non-limiting example, the single point multi-component authentication system may allow access to the user account when all of the received authentication credentials have been validated as compared to the pre-determined sequence and associated valid authentication credentials for each of the authenticated input locations. Such an access allowance to the user account may be determined by the single point multi-component authentication system as a step-by-step analysis as each authentication credential is received and/or as a single analysis of all the authentication credentials once the number of valid authentication credentials associated with the pre-determined sequence have been received (e.g., as a single-step analysis and determination of the validity for all the authentication credentials).

FIG. 4 illustrates a process flow 400 for disallowing access to the user account, in accordance with an embodiment of the disclosure. In some embodiments, a system (e.g., similar to one or more of the systems described herein with respect to FIGS. 1A-1C and 2) may perform one or more of the steps of process flow 400. For example, a single point multi-component authentication system (e.g., the system 130 described herein with respect to FIG. 1A-1C) may perform the steps of process flow 400.

As shown in block 402, the process flow 400 may include the step of determining whether the first authentication credential is invalid. By way of non-limiting example, the single point multi-component authentication system may determine the first authentication is invalid by determining at least one of the first authentication credential received does not match the first valid authentication credential and/or first unverified location does not match the first authenticated input location.

As shown in block 404, the process flow 400 may include the step of determining, in an instance at least one of the first unverified location is not the same as the first authenticated input location or wherein the first authentication credential is not the same as the first valid authentication credential, the first authentication is invalid. By way of non-limiting example, the single point multi-component authentication system may determine—based on the pre-determined sequence and each of the associated valid authentication credentials—the user account should not be accessed when at least one of the received authentication credentials and associated unverified input locations does not match the associated valid authentication credential and associated authenticated input location, respectively, for the particular position/order in the pre-determined sequence.

As shown in block 406, the process flow 400 may include the step of determining whether the second authentication credential is invalid. By way of non-limiting example, the single point multi-component authentication system may receive the second authentication credential after the first authentication credential, based on the determining the second authentication credential received does not match the second valid authentication credential and/or second unverified location does not match the second authenticated input location.

As shown in block 408, the process flow 400 may include the step of determining, in an instance where at least one of the second unverified location is not the same as the at least second input location or wherein the second authentication credential is not the same as the at least second valid authentication credential, the second authentication credential is invalid. By way of non-limiting example, the single point multi-component authentication system may receive a second authentication credential at a second unverified location of the plurality of input locations of the multi-component authentication graphical user interface, once the first authentication credential has been received at the first unverified location. Thus, and in some embodiments, the single point multi-component authentication system may receive each of the authentication credentials at each of the associated unverified input locations and determine the validity of each of the authentication credentials based whether each of the valid authentication credentials and associated authenticated input locations match, for each of the positions/order of the predetermined sequence. Thus, and where at least one of the received authentication credentials at an unverified input location does not match the valid authentication credential and/or the authenticated input location for the pre-determined sequence, the single point multi-component authentication system will determine the authentication credential is invalid.

As shown in block 410, the process flow 400 may include the step of disallowing, in an instance where at least one of the first authentication credential or the second authentication credential is invalid, access to the user account. For instance, and where the second authentication credential received at a second unverified input location does not match at least one of the second valid authentication credential and/or the second authenticated input location, the single point multi-component authentication system may generate a graphical user interface (e.g., by configuring the multi-component authentication graphical user interface) to indicate to the user attempting to access the user account that access has been denied. In some embodiments, such a graphical user interface may comprise a graphical user interface component configured to allow the user attempting to access the user account to re-attempt to access the user account by inputting authenticating credentials in the pre-determined sequence, in another instance.

FIG. 5 illustrates a process flow 500 for training a single point multi-component authentication machine learning model, in accordance with an embodiment of the disclosure. In some embodiments, a system (e.g., similar to one or more of the systems described herein with respect to FIGS. 1A-1C and 2) may perform one or more of the steps of process flow 500. For example, a single point multi-component authentication system (e.g., the system 130 described herein with respect to FIG. 1A-1C) may perform the steps of process flow 500.

As shown in block 502, the process flow 500 may include the step of identifying data associated with the user account, wherein the data comprises at least one of threat data, current access data, historical access data, or rank data. In some embodiments, the single point multi-component authentication system may identify data associated with the user account and/or a plurality of user accounts which may be used to train a machine learning model of the single point multi-component authentication system (e.g., single point multi-component authentication machine learning model) based on the data of the user account(s) and associated user. For instance, such a machine learning model (e.g., single point multi-component authentication machine learning model) may be trained to look for particular threats to the user account and/or other accounts/applications associated with the network of the user account.

In some embodiments, the threat data which may be used to train the machine learning model (e.g., single point multi-component authentication machine learning model) may comprise data regarding a user account's ability to access certain other accounts and/or applications, which could be a threat to an entity, an individual, a network, and/or the like associated with the user account. For instance, and where a user account is able to access certain personally identifiable information (e.g., home addresses, social security numbers, and/or the like) and/or the user account is able to access certain high security applications (e.g., a payroll application, a retirement account and/or the like), the machine learning model may determine the user account is likely a threat if accessed by a different, unverified user (i.e., a bad actor).

In some embodiments, the current access data may comprise data regarding a user account's current applications it can access without separate verifications (e.g., separate authentication credentials), such as through the use of a single-sign on verification, the single point multi-component authentication system may determine certain previous applications would be a threat if accessed by a user other than the verified user of the user account.

In some embodiments, the historical access data may comprise data regarding a user account's historical applications and/or user accounts previously accessed, whereby certain applications and/or user accounts may be an indication that the user account currently has access to certain current applications would be a threat if accessed by a user other than the verified user of the user account.

In some embodiments, the rank data may comprise a ranking within an entity associated with the user account, such as an executive ranking (e.g., an executive position), a managerial ranking (e.g., a managerial position), and/or the like. In some embodiments, and the higher the ranking associated with the user account, the single point multi-component authentication system may determine the user account can access certain applications and/or accounts which could be a greater threat if accessed by an unverified user.

As shown in block 504, the process flow 500 may include the step of creating a first training data set comprising the data associated with the user account. In some embodiments and based on the data identified by the single point multi-component authentication system associated with the user account(s), the single point multi-component authentication system may aggregate the data to create a first training data set. Further, and in some embodiments, the single point multi-component authentication system may periodically generate a plurality of training data sets to continuously train the single point multi-component authentication machine learning model.

As shown in block 506, the process flow 500 may include the step of training the single point multi-component authentication machine learning model in a first stage using the data associated with the user account. By way of non-limiting example, the single point multi-component authentication system may train the single point multi-component authentication machine learning model based on the identified data, whereby the single point multi-component authentication machine learning model may be trained to determine at least one of the pre-determined sequence, the valid authentication credential(s), and/or the like, based on the user account's likelihood to be a threat if accessed by an unverified user. For instance, and if the user account is likely to be a threat if accessed by an unverified user, the single point multi-component authentication machine learning model may determine a particular pre-determined sequence unlikely to be guessed and/or brute force attacked by an unverified user (e.g., a particular order of authenticated input locations), a particular splicing and/or rendition of a passcode previously used by the use account which would be unlikely to be guessed and/or brute force attacked by an unverified user (e.g., using irregular characters and/or irregular splicing, such as in the middle and/or in thirds of a phrase of a passcode).

FIG. 6 illustrates a process flow 600 for generating a plurality of blank input locations for the plurality of input locations on a graphical user interface, in accordance with an embodiment of the disclosure. In some embodiments, a system (e.g., similar to one or more of the systems described herein with respect to FIGS. 1A-1C and 2) may perform one or more of the steps of process flow 600. For example, a single point multi-component authentication system (e.g., the system 130 described herein with respect to FIG. 1A-1C) may perform the steps of process flow 600.

As shown in block 602, the process flow 600 may include the step of receiving a submission request for the first authentication credential. By way of non-limiting example, the single point multi-component authentication system may receive a submission request via a graphical user interface (e.g., a multi-component authentication graphical user interface), whereby the submission request may be transmitted from the multi-component authentication graphical user interface to the single point multi-component authentication system via a network, such as network 110 of FIG. 1A. In some embodiments, the single point multi-component authentication system may receive the submission request (e.g., such as a "Next" submission between authentication credentials and/or a final submission request once all authentication credentials for the pre-determined sequence have been input). In some embodiments, the single point multi-component authentication system may require a submission request be entered via the multi-component authentication graphical user interface after each authentication credential is received. In some additionally embodiments, the single point multi-component authentication system automatically submit all the authentication credentials received once the number of authentication credentials have been met for the pre-determined sequence, whereby the automatic submission may be used to determine the validity of each of the authentication credentials, at a single time. In some embodiments, and as the submission request is entered with each authentication credential, the single point multi-component authentication system may determine the validity of each authentication credential as it is received such that access may be denied automatically and immediately once an authentication credential is determined to be invalid.

As shown in block 604, the process flow 600 may include the step of generating, based on the submission request for the first authentication credential, a plurality of blank input locations for the plurality of input locations. By way of non-limiting example, the single point multi-component authentication system may generate a plurality of blank input locations for the plurality of input locations on the multi-component authentication graphical user interface, whereby the plurality of input locations may appear to be "reset" (e.g., blank) for each instance of the single point multi-component authentication system receiving an authentication credential.

As shown in block 606, the process flow 600 may include the step of receiving a second submission request for the second authentication credential. By way of non-limiting example, the single point multi-component authentication system may receive a second submission request for the second authentication credential and a submission request for each of the authentication credentials received thereafter associated with the pre-determined sequence.

As shown in block 608, the process flow 600 may include the step of generating, based on the second submission request for the second authentication credential, the plurality of blank input locations for the plurality of input locations. By way of non-limiting example, the single point multi-component authentication system may generate, based on the second submission request and the submission request(s) received thereafter, a plurality of blank input locations for the plurality of input locations of the multi-component authentication graphical user interface.

In some embodiments and based on generating the blank input locations in the multi-component authentication graphical user interface, the pre-determined sequence may comprise a plurality of authenticated input locations whereby adjacent authenticated input locations in the pre-determined sequence may comprise the same input location (e.g., the same graphical user interface component to receive a passcode).

FIG. 7 illustrates an exemplary multi-component authentication graphical user interface, in accordance with an embodiment of the disclosure. In some embodiments, a system (e.g., similar to one or more of the systems described herein with respect to FIGS. 1A-1C and 2) may generate one or more of the graphical user interface components of 700. For example, a single point multi-component authentication system (e.g., the system 130 described herein with respect to FIG. 1A-1C) may generate the graphical user interface components of 700.

In some embodiments and as exemplarily shown in graphical user interface 700 (i.e., a multi-component authentication graphical user interface 750), the multi-component authentication graphical user interface 750 may comprise a plurality of input locations such as that shown as input location 1 (715), input location 2 (725), input location 3 (735), input location 4 (745), input location 5 (755), input location 6 (765), input location 7 (775), input location 8 (785), input location 9 (795), and/or the like. For instance, at least one of the input locations (e.g., 715, 725, 735, 745, 755, 765, 775, 785, 795, and/or the like) may be selected as authenticated input locations for the pre-determined sequence.

In some embodiments and based on the user identifier received at input location 705 of the multi-component authentication graphical user interface 750, which may be used by the single point multi-component authentication system to determine the user account attempted to be accessed. For instance, such a user identifier may comprise a unique combination of alphanumeric letters, numbers, and characters which may be generated by the user of the user account, a manager of the user account, by the single point multi-component authentication system, and/or the like. Once a user account has been identified, the single point multi-component authentication system may determine the pre-determined sequence and associated valid authentication credentials for the user account and compare the received authentication credentials at each input location against the pre-determined sequence and valid authentication credentials.

By way of non-limiting example and as shown in the multi-component authentication graphical user interface 750, a pre-determined sequence may comprise authenticated input locations in a particular order such as input location 7 (775), input location 5 (755), and input location 6 (765). Additionally, the single point multi-component authentication system may identify the valid authentication credentials associated with the pre-determined sequence to be "Un1qu3.", "Pa$$scod3", and "Pa$$w0rd" for each of the authenticated input locations, in the same particular order. Thus, and in the instance where the first authentication credential received by the single point multi-component authentication system is "Pa$$w0rd" at location 7, the single point multi-component authentication system may determine the first authentication credential is invalid. Similarly, and where the second authentication credential received is "Pa$$scod3" at location 3 (735), the single point multi-component authentication system may determine the second authentication credential received is invalid.

By way of non-limiting example, and where each of the authentication credentials are entered in the correct locations (e.g., the authenticated input locations) and in the correct sequence (e.g., "Un1qu3." in input location 7 (735), "Pa$$scod3" in input location 5 (755), and "Pa$$w0rd" in input location 6 (765)), the single point multi-component authentication system may allow access to the user account.

Further, and in some embodiments, each time an authentication credential is input, a user attempting access to the user account may select the graphical user interface component associated with a submission request (e.g., submission request "button" 798) to submit the authentication credential to the single point multi-component authentication system for validation.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 14521US1.014033.4629 | To be assigned | SYSTEMS, METHODS, AND APPARATUSES FOR IMPLEMENTING A MULTI-COMPONENT AUTHENTICATION USING PREDETERMINED SEQUENCES AND INDICATORS IN AN ELECTRONIC ENVIRONMENT | Filed Concurrently Herewith |

What is claimed is:

1. A system for implementing a single point multi-component authentication using a pre-determined sequence, the system comprising:
a memory device comprising non-transitory computer-readable medium with computer-readable program code stored thereon;
at least one processing device operatively coupled to the at least one memory device and the at least one communication device, wherein when executed the computer-readable code is configured to cause the at least one processing device to:
identify a pre-determined sequence associated with a user account, wherein the pre-determined sequence comprises a first authenticated input location and at least a second authenticated input location, and wherein the pre-determined sequence is generated by a single point multi-component authentication machine learning model;
identify a plurality of valid authentication credentials associated with the user account, wherein the plurality of valid authentication credentials comprises a first valid authentication credential and at least a second valid authentication credential;
generate a multi-component authentication graphical user interface, wherein the multi-component authentication graphical user interface comprises a plurality of input locations;
receive a first authentication credential at a first unverified location of the plurality of input locations;
determine whether the first authentication credential is valid,
wherein, in an instance where the first unverified location is the same as the first authenticated input location and wherein the first authentication credential is the same as the first valid authentication credential, determine the first authentication credential to be valid;
receive a second authentication credential at a second unverified location of the plurality of input locations;
determine whether the second authentication credential is valid,
wherein, in an instance where the second unverified location is the same as the at least second authenticated input location and wherein the second authentication credential is the same as the at least second valid authentication credential, determine the second authentication credential is valid; and
allow, in an instance where the first authentication credential is valid and the second authentication credential is valid, access to the user account.

2. The system of claim 1, wherein when executed, the computer-readable code is further configured to cause the processing device to:
determine whether the first authentication credential is invalid,
wherein, in an instance where at least one of the first unverified location is not the same as the first authenticated input location or wherein the first authentication credential is not the same as the first valid authentication credential, determine the first authentication credential is invalid;
determine whether the second authentication credential is invalid,
wherein, in an instance where at least one of the second unverified location is not the same as the at least second authenticated input location or wherein the second authentication credential is not the same as the at least second valid authentication credential, determine the second authentication credential is invalid; and
disallow, in an instance where at least one of the first authentication credential or the second authentication credential is invalid, access to the user account.

3. The system of claim 1, wherein the single point multi-component authentication machine learning model is trained and wherein when executed, the computer-readable code is further configured to cause the processing device to:
identify data associated with the user account, wherein the data comprises at least one of threat data, current access data, historical access data, or rank data;
create a first training data set comprising the data associated with the user account; and
train the single point multi-component authentication machine learning model in a first stage using the data associated with the user account.

4. The system of claim 1, wherein the pre-determined sequence is generated by a user associated with the user account.

5. The system of claim 1, wherein the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

6. The system of claim 1, wherein the at least the second authenticated input location is less than the plurality of input locations.

7. The system of claim 1, wherein the first valid authentication credential is a first passcode and wherein the second valid authentication credential is a second passcode.

8. The system of claim 1, wherein the first valid authentication credential is a first portion of a passcode and the second valid authentication credential is a second portion of the passcode.

9. The system of claim 1, wherein when executed, the computer-readable code is further configured to cause the processing device to:

receive a submission request for the first authentication credential;
generate, based on the submission request for the first authentication credential, a plurality of blank input locations for the plurality of input locations;
receive a second submission request for the second authentication credential; and
generate, based on the second submission request for the second authentication credential, the plurality of blank input locations for the plurality of input locations.

10. A computer-program product for implementing a single point multi-component authentication using a pre-determined sequence, wherein the computer program product comprises at least one non-transitory computer-readable medium having computer-readable program code portions embodied therein, the computer-readable program code portions which when executed by a processing device are configured to cause the processor to:
identify a pre-determined sequence associated with a user account, wherein the pre-determined sequence comprises a first authenticated input location and at least a second authenticated input location, and wherein the pre-determined sequence is generated by a single point multi-component authentication machine learning model;
identify a plurality of valid authentication credentials associated with the user account, wherein the plurality of valid authentication credentials comprises a first valid authentication credential and at least a second valid authentication credential;
generate a multi-component authentication graphical user interface, wherein the multi-component authentication graphical user interface comprises a plurality of input locations;
receive a first authentication credential at a first unverified location of the plurality of input locations;
determine whether the first authentication credential is valid,
wherein, in an instance where the first unverified location is the same as the first authenticated input location and wherein the first authentication credential is the same as the first valid authentication credential, determine the first authentication credential to be valid;
receive a second authentication credential at a second unverified location of the plurality of input locations;
determine whether the second authentication credential is valid,
wherein, in an instance where the second unverified location is the same as the at least second authenticated input location and wherein the second authentication credential is the same as the at least second valid authentication credential, determine the second authentication credential is valid; and
allow, in an instance where the first authentication credential is valid and the second authentication credential is valid, access to the user account.

11. The computer program product of claim 10, wherein the computer-readable program code portions which when executed by a processing device are further configured to cause the processing device to:
determine whether the first authentication credential is invalid,
wherein, in an instance where at least one of the first unverified location is not the same as the first authenticated input location or wherein the first authentication credential is not the same as the first valid authentication credential, determine the first authentication credential is invalid;
determine whether the second authentication credential is invalid,
wherein, in an instance where at least one of the second unverified location is not the same as the at least second authenticated input location or wherein the second authentication credential is not the same as the at least second valid authentication credential, determine the second authentication credential is invalid; and
disallow, in an instance where at least one of the first authentication credential or the second authentication credential is invalid, access to the user account.

12. The computer program product of claim 10, wherein the computer-readable program code portions which when executed by a processing device are further configured to cause the processing device to:
identify data associated with the user account, wherein the data comprises at least one of threat data, current access data, historical access data, or rank data;
create a first training set comprising the data associated with the user account; and
train the single point multi-component authentication machine learning model in a first stage using the data associated with the user account.

13. The computer program product of claim 10, wherein the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

14. A computer-implemented method for implementing a single point multi-component authentication using a pre-determined sequence, the computer-implemented method comprising:
identifying a pre-determined sequence associated with a user account, wherein the pre-determined sequence comprises a first authenticated input location and at least a second authenticated input location, and wherein the pre-determined sequence is generated by a single point multi-component authentication machine learning model;
identifying a plurality of valid authentication credentials associated with the user account, wherein the plurality of valid authentication credentials comprises a first valid authentication credential and at least a second valid authentication credential;
generating a multi-component authentication graphical user interface, wherein the multi-component authentication graphical user interface comprises a plurality of input locations;
receiving a first authentication credential at a first unverified location of the plurality of input locations;
determining whether the first authentication credential is valid,
wherein, in an instance where the first unverified location is the same as the first authenticated input location and wherein the first authentication credential is the same as the first valid authentication credential, determine the first authentication credential to be valid;
receiving a second authentication credential at a second unverified location of the plurality of input locations;

determining whether the second authentication credential is valid,
  wherein, in an instance where the second unverified location is the same as the at least second authenticated input location and wherein the second authentication credential is the same as the at least second valid authentication credential, determining the second authentication credential is valid; and
allowing, in an instance where the first authentication credential is valid and the second authentication credential is valid, access to the user account.

15. The computer-implemented method of claim 14, further comprising:
determining whether the first authentication credential is invalid,
  wherein, in an instance where at least one of the first unverified location is not the same as the first authenticated input location or wherein the first authentication credential is not the same as the first valid authentication credential, determine the first authentication credential is invalid;
determine whether the second authentication credential is invalid,
  wherein, in an instance where at least one of the second unverified location is not the same as the at least authenticated second input location or wherein the second authentication credential is not the same as the at least second valid authentication credential, determine the second authentication credential is invalid; and
disallow, in an instance where at least one of the first authentication credential or the second authentication credential is invalid, access to the user account.

16. The computer-implemented method of claim 14, further comprising:
identifying data associated with the user account, wherein the data comprises at least one of threat data, current access data, historical access data, or rank data;
creating a first training set comprising the data associated with the user account; and
training the single point multi-component authentication machine learning model in a first stage using the data associated with the user account.

17. The computer-implemented method of claim 14, wherein the at least the second authenticated input location comprises at least one of one authenticated input location, two authenticated input locations, three authenticated input locations, four authenticated input locations, five authenticated input locations, six authenticated input locations, seven authenticated input locations, or eight authenticated input locations.

* * * * *